United States Patent
Sato

(10) Patent No.: US 9,016,867 B2
(45) Date of Patent: Apr. 28, 2015

(54) PROJECTOR

(71) Applicant: Osamu Sato, Kanagawa (JP)

(72) Inventor: Osamu Sato, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 214 days.

(21) Appl. No.: 13/660,255

(22) Filed: Oct. 25, 2012

(65) Prior Publication Data

US 2013/0128233 A1    May 23, 2013

(30) Foreign Application Priority Data

Nov. 22, 2011   (JP) ................................ 2011-255028

(51) Int. Cl.

| | | |
|---|---|---|
| *G03B 21/20* | (2006.01) | |
| *G03B 21/16* | (2006.01) | |
| *G03B 21/18* | (2006.01) | |
| *G02B 23/16* | (2006.01) | |
| *G03B 11/04* | (2006.01) | |
| *H04N 9/31* | (2006.01) | |
| *G03B 21/28* | (2006.01) | |
| *G03B 33/12* | (2006.01) | |

(52) U.S. Cl.
CPC .............. *H04N 9/3144* (2013.01); *G03B 21/16* (2013.01); *G03B 21/2086* (2013.01); *G03B 21/28* (2013.01); *G03B 33/12* (2013.01)

(58) Field of Classification Search
CPC ............................. G03B 21/14; H04N 9/3197
USPC ................... 353/97, 88, 122, 85, 52; 359/511
See application file for complete search history.

(56) References Cited

U.S. PATENT DOCUMENTS

| | | | | |
|---|---|---|---|---|
| 6,322,218 B1 * | 11/2001 | Sugawara et al. | ................ | 353/52 |
| 7,677,739 B2 * | 3/2010 | Kuroda | ............................ | 353/88 |
| 2004/0075822 A1 | 4/2004 | Hattori | | |
| 2006/0066816 A1 | 3/2006 | Horiguchi et al. | | |
| 2007/0211221 A1 * | 9/2007 | Yang et al. | ........................ | 353/52 |
| 2009/0040468 A1 | 2/2009 | Kameoka et al. | | |
| 2009/0051882 A1 | 2/2009 | Yoshimura et al. | | |
| 2010/0066981 A1 | 3/2010 | Kato | | |

FOREIGN PATENT DOCUMENTS

| | | |
|---|---|---|
| CN | 1584729 A | 2/2005 |
| CN | 101082764 A | 12/2007 |
| CN | 101673031 A | 3/2010 |
| EP | 1 640 795 A1 | 3/2006 |
| EP | 2 034 357 A1 | 3/2009 |

(Continued)

OTHER PUBLICATIONS

Extended Search Report issued Feb. 27, 2013 in European Patent Application No. 12191393.3.

(Continued)

*Primary Examiner* — William C Dowling
*Assistant Examiner* — Ryan Howard
(74) *Attorney, Agent, or Firm* — Oblon, McClelland, Maier & Neustadt, L.L.P.

(57) ABSTRACT

A projector includes a housing, a light source disposed in the housing, a light projection unit, disposed in the housing, to project light emitted from the light source, a detector to detect a load caused by an object blocking the light projection unit, and a microprocessor to activate a protection operation for the projector when the detector detects that the load caused by the object blocking the light projection unit exceeds a threshold load.

8 Claims, 4 Drawing Sheets

(56) References Cited

FOREIGN PATENT DOCUMENTS

| | | |
|---|---|---|
| JP | 4-60534 | 2/1992 |
| JP | 2001-092014 | 4/2001 |
| JP | 2004-289368 | 10/2004 |
| WO | WO 2008/047527 A1 | 4/2008 |

OTHER PUBLICATIONS

Combined Chinese Office Action and Search Report issued Sep. 3, 2014 in Patent Application No. 201210482529.2 with English Translation of Category of Cited Documents.

\* cited by examiner

PROJECTOR

CROSS-REFERENCE TO RELATED APPLICATION

This application claims priority to Japanese Patent Application No. 2011-255028, filed on Nov. 22, 2011 in the Japan Patent Office, which is incorporated by reference herein in its entirety.

BACKGROUND

1. Technical Field

The present invention relates to a projector having a housing encasing a projection lens.

2. Description of the Background Art

Projectors use a projection lens to project enlarged images on a screen. When a projector is used for image projection, an object such as notebooks and notepads may be deliberately placed in front of the projection lens to block the light. However, the heat caused by light received by the object may damage the object, and may cause the projection lens and projector to malfunction as well.

Conventional projectors are generally horizontal projectors having the projection lens on one lateral side of the projector, and such projector may use an upward projection system in view of the positional relationship with the screen. Therefore, even if the object is placed in front of the projection lens, a gap or space can be set between the projection lens and the object. Therefore, the object, the projection lens, and the projector are protected from damage.

Further, JP-2001-092014-A discloses a configuration of a projector shown in FIG. 1 having a housing 30 and a projection lens 31, in which air that has cooled the inside of the housing 30 is exhausted from the side of the projection lens 31 as exhaust 33. The pressure of the exhaust 33 may fluctuate due to the presence of an object 34 placed in front of the projection lens 31, and such fluctuation can be detected by a sensor 32. Based on readings from the sensor 32, the lamp output power of the projector is reduced to prevent malfunction of the projector due to the presence of the object.

However, some projectors have the projection unit on the top face of the housing, which may be a horizontal or slanted surface, wherein the projection unit outputs light via the projection lens. When an object such as paper or the like is placed on top of such a housing, the light projection unit and paper may contact each other very closely, and thus a gap or space is unlikely to be maintained between the projection unit and the object. Therefore, heat accumulates between the projection unit and paper, possibly damaging the projector. Moreover, because there is not enough space between the light projection unit and the object, the configuration disclosed in JP-2001-092014-A cannot be used.

Further, even if the light projection unit is disposed at the lateral side of the horizontal projector, if the object such as paper, cloth, or the like is placed on top of the housing, some part of the object may drape over the light projection unit, blocking the light output from the projection unit and causing the problems described above.

SUMMARY

The present invention is conceived in light of the above-described problems, and provides a novel projector. The projector includes a housing; a light source disposed in the housing; a light projection unit, disposed in the housing, to project light emitted from the light source; a detector to detect a load caused by an object blocking the light projection unit; and a microprocessor to activate a protection operation for the projector when the detector detects that the load caused by the object blocking the light projection unit exceeds a threshold load.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
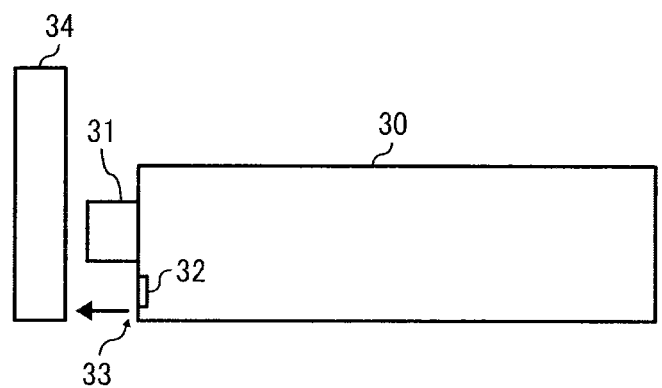
FIG. 1 shows a configuration of a conventional projector.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result.

Referring now to the drawings, an apparatus or system according to an example embodiment is described hereinafter.

A description is given of a small-sized projector having a housing including a horizontal or slanted top face, and a light projection unit that projects light through the horizontal or slanted top face. Such projector may be referred to as a vertical projector.

Figure 2:
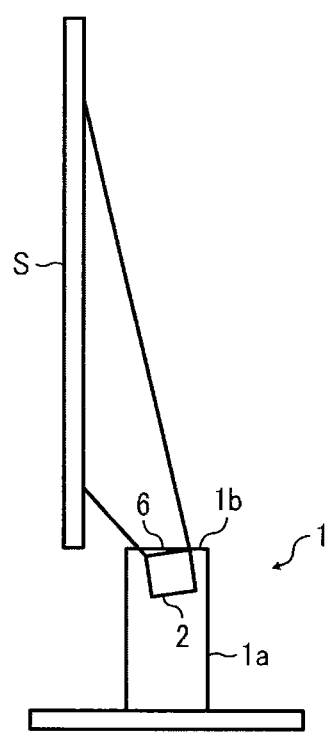
FIG. 2 shows a projector having a light projection unit on its top face disposed at a projection position.
Figure 3:
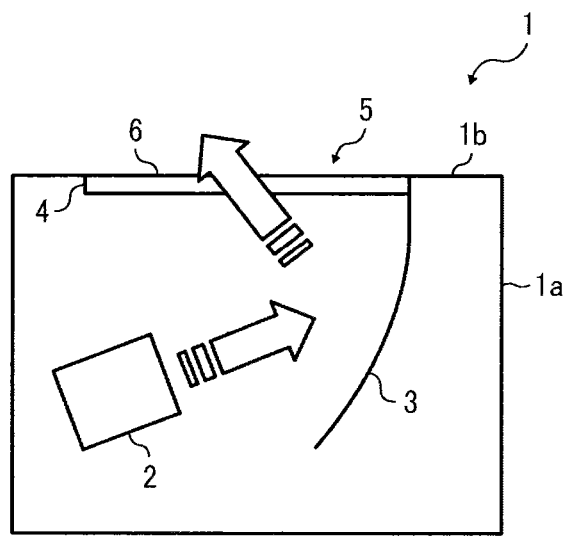
FIG. 3 shows a projector having a light projection unit on its top face disposed having another internal configuration.

FIGS. 2 and 3 show examples of projector having a light projection unit on its top face and disposed at a projection position. Such projector 1 may be called a vertical projector. The projector 1 shown in FIG. 2 includes, for example, a housing 1a having a top face 1b, a light projection unit 6, and a projection lens 2. The light projection unit 6 projects light coming from the projection lens 2 through the top face 1b of the housing 1a. As such, the light projection unit 6 is disposed in the housing 1a while near to the top face 1b. Such projector 1 is placed under a screen S, and light is projected to the screen S in an upward direction from the projector 1 to project images on the screen S.

As shown in FIG. 2, the projection lens 2 is disposed in the housing 1a, and the light can be projected from the projection lens 2 to the screen S via the light projection unit 6 disposed near the top face 1b of the housing 1a. Compared to horizontal projectors, a two-dimensional installation space or occupied space of the projector 1 can be reduced, and further, the distance between the screen S and the projector 1 can be set shorter, and thereby the projector 1 is suitable for use in smaller rooms.

Further, the projector 1 can be also configured as shown in FIG. 3. Specifically, the projection lens 2 can be disposed at a lower portion in the housing 1a, and a reflection mirror 3 disposed in the housing 1a reflects the light outgoing from the projection lens 2.

The light projection unit 6 is disposed near the top face 1b of the housing 1a with an opening 4. The light can be projected from the opening 4 to the screen S. The configuration shown in FIG. 3 can set a longer light-path length for the light exiting from the projection lens 2 and reaching the screen S compared to the configuration shown in FIG. 2, by which the image enlargement ratio can be set greater. Further, the reflection mirror 3 may be a concave-face minor or a convex-face mirror, which can be selected in view of the optical system configuration.

As for the configuration shown in FIG. 3, dust or foreign particles may enter the housing 1a through the opening 4, and then adhere to the reflection mirror 3. To reduce such adhesion of dust or foreign particles, the top face 1b of the housing 1a is covered by a dust-proof filter 5. If the dust-proof filter 5 is disposed on the top face 1b, the top face 1b becomes a flat face, and thereby a object such as notebooks and notepads can be more likely placed on the top face 1b of the projector 1.

Figure 4:
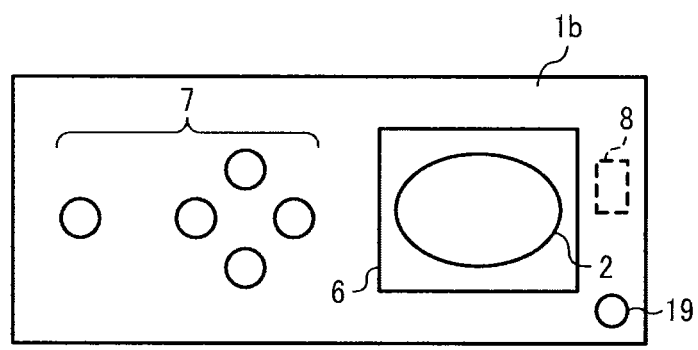
FIG. 4 shows an example top face of projector according to an example embodiment.

FIG. 4 shows an example arrangement on a top face of the projector 1 according to an example embodiment. When the projector 1 is a vertical projector, the top face 1b of the housing 1a may be disposed with the light projection unit 6 and the projection lens 2, which projects light. In the configuration of FIG. 3, the dust-proof filter 5 is disposed on the top face 1b of the housing 1a.

Further, the top face 1b of the projector 1 may be disposed with an operation unit having operation buttons to operate the projector 1. Therefore, when an object such as a notebook is placed on the top face 1b, the object may be typically placed on the light projection unit 6 by evading the operation unit 7. If the object is placed on or over the light projection unit 6, the light cannot be projected to the screen, and the object may be damaged due to heat caused by the light from the projection lens 2, and at worst, the projector 1 itself may malfunction.

In view of such situation, the projector 1 includes a pressure sensor 8 on the top face 1b of the housing 1a to detect the object. The pressure sensor 8 may be a piezoelectric sensor, but is not limited thereto. If the presence of an object on the top face 1b of the housing 1a is detected by the pressure sensor 8, a protection operation or protection function can be activated as described later.

Further, as shown in FIG. 4, the pressure sensor 8 is disposed on the top face 1b of the housing 1a, which may be near the light projection unit 6. If the pressure sensor 8 is disposed near the operation unit 7, the pressure sensor 8 may detect pressure caused by pressing the operation buttons. Therefore, to prevent such false detection or misdetection, the pressure sensor 8 is preferably disposed near the light projection unit 6.

Figure 5:
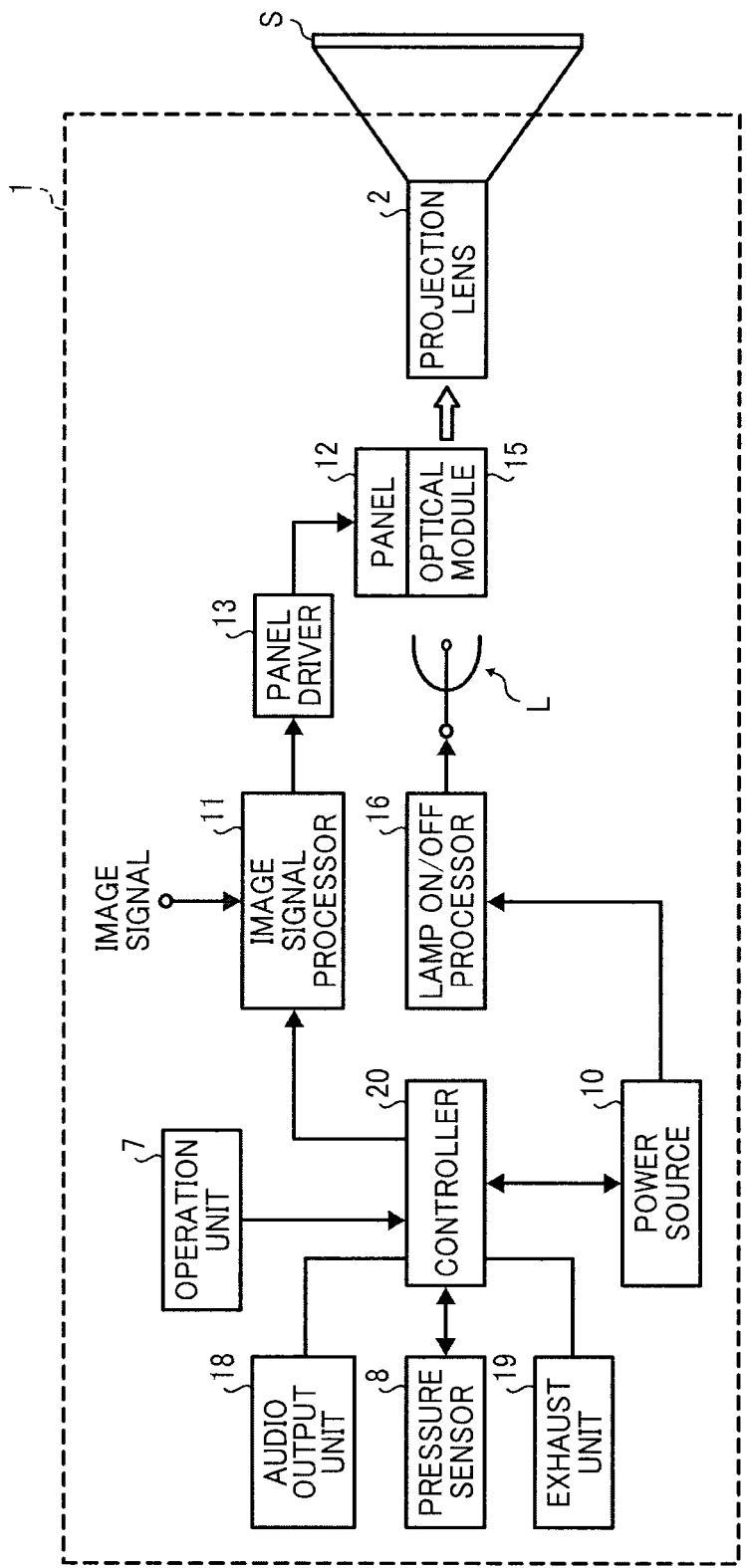
FIG. 5 shows a block diagram of a projector according to an example embodiment.

FIG. 5 shows an example block diagram of the projector 1 according to an example embodiment. The projector 1 includes a light source L, a power source 10, the projection lens 2, an image signal processor 11, a panel 12, a panel driver 13, an optical module 15, a lamp ON/OFF processor 16, a controller 20 which may be also called a microprocessor 20, the operation unit 7 having operation buttons, and the pressure sensor 8. The light source L may be, for example, a lamp, and the projection lens 2 is used to project light coming from the light source L to the screen S.

The projector 1 may be connected to external devices such as a personal computer (PC) using an input/output interface (I/F) such as serial interface (I/F). Upon receiving color image signals from the PC via the input/output I/F, the image signal processor 11 conducts an analog/digital (A/D) conversion, an image-angle conversion, or the like.

The panel 12 displays images processed by the image signal processor 11 on a liquid crystal screen or the like. Based on the displayed images, the light emitted by the light source L may be modulated, and supplied to the projection lens 2. As such, the panel 12 may function as a modulator of light. The panel 12 may be a liquid crystal panel such as transmission type liquid crystal panel. The panel 12 may be also referred to as the liquid crystal panel 12.

The panel driver 13 converts color image signals to a data format displayable on the liquid crystal panel 12, and the supplies color image signals to the liquid crystal panel 12.

The optical module 15 guides light emitted by the light source L to the liquid crystal panel 12. The lamp ON/OFF processor 16 controls the light source L. The controller 20 such as a microprocessor controls the image signal processor 11, the lamp ON/OFF processor 16, or the like, and a detection process of the object and activation of the protection operation. The operation unit 7 is used to input commands to the controller 20. The pressure sensor 8 can detect the object placed on the top face 1b of the housing 1a of the projector 1.

In such configuration, except the operation unit 7 and the pressure sensor 8 disposed on the top face 1b of the housing 1a, other units may be encased in the housing 1a.

Further, the projection lens 2 can project enlarged images based on light coming from the optical module 15, which corresponds to image signals modulated by the panel 12, and focuses images on the screen S.

Further, when the pressure sensor 8 detects pressure applied on the top face 1b of the housing 1a such as near the light projection unit 6, the pressure sensor 8 outputs a detection signal corresponding to the pressure level to the controller 20, by which load such as weight of the object that is applied on the top face 1b of the housing 1a is reported. The controller 20 includes, for example, a central processing unit (CPU), a random access memory (RAM), and a read only memory (ROM). By reading out programs stored in the ROM to the RAM, the controller 20 can conduct various controls for the projector 1.

Figure 6:
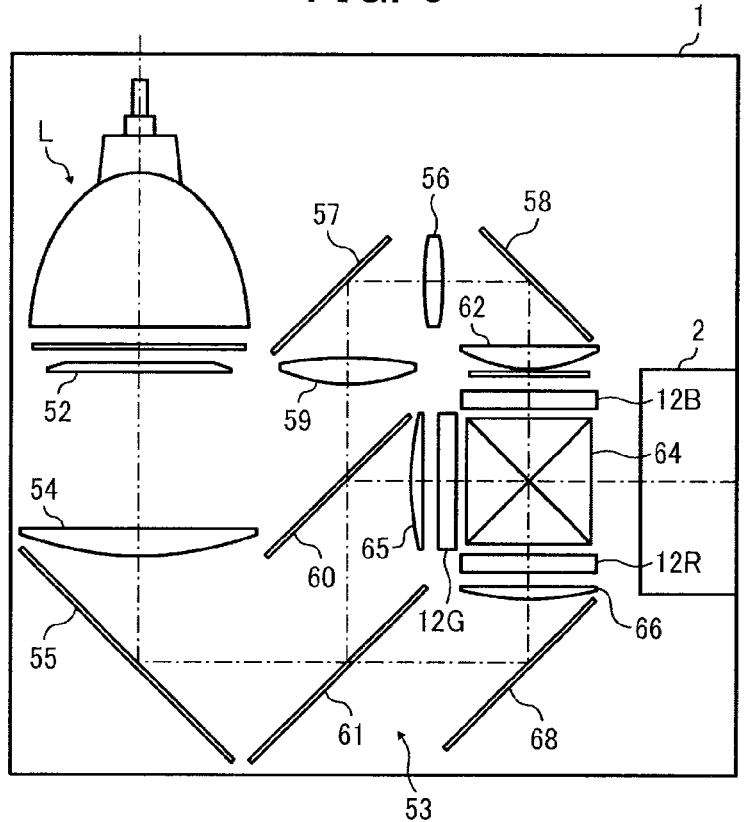
FIG. 6 shows a configuration of an optical unit of a projector according to an example embodiment.

FIG. 6 shows an example configuration of an optical unit of the projector 1. The projector 1 includes the optical module 15, and the optical module 15 includes, for example, a first lens array 52, and a compound lens 54. The first lens array 52 is arranged at a position facing the light exit plane of the light source L, and the compound lens 54 is arranged at the exit side of the first lens array 52. The light exiting from the compound lens 54 is reflected by a reflection mirror 55, and then enters a light separation unit 53 having, for example, a first dichroic mirror 61 and a second dichroic mirror 60, and a reflection mirror 68.

The optical module 15 further includes, for example, an incident-side lens 59, a relay lens 56, reflection mirrors 57 and 58, field lenses 62, 65, 66, liquid crystal panels 12R, 12G, 12B, and a cross dichroic prism 64.

The reflection mirror 55 reflects the light exiting from the compound lens 54 towards the light separation unit 53. The light separation unit 53 can separate the light exiting from the compound lens 54 into three color lights such as red, green, and blue lights by using the dichroic mirrors 61 and 60.

Among the light coming from the compound lens 54, the first dichroic mirror 61 passes red light component, and reflects blue light component and green light component. The red light component passed through the first dichroic mirror 61 is reflected at the reflection mirror 68, passes the field lens 66, and then reaches a red-light liquid crystal panel 12R used for red light. The field lens 66 converts light beams exiting from the compound lens 54 to parallel light beams, which are parallel to the center of light beams (or main light beam). The field lenses 62 and 65 disposed at other corresponding liquid crystal panel can function in a same manner.

As for the blue light and green light reflected by the first dichroic mirror 61, the green light is reflected by the second dichroic mirror 60, passes through the field lens 65, and then reaches a green-light liquid crystal panel 12G.

Meanwhile, the blue light passes through the second dichroic mirror 60, and passes through a light-guide system such as the incident-side lens 59, and then reflected at the reflection mirror 57. Then, the blue light passes through the relay lens 56, and is reflected at the reflection mirror 58. Further, the blue light passes through the field lens 62, and reaches a blue light liquid crystal panel 12B.

Each of the liquid crystal panels 12R, 12G, 12B can function as a light modulator that modulates the received light based on the received image information such as image signal. With such a configuration, each of the color lights that enters the corresponding liquid crystal panels 12R, 12G, 12B, respectively, can be modulated based on the corresponding image information, and then an image corresponding to each of the color lights is formed.

Three modulated color lights exiting from the liquid crystal panels 12R, 12G, 12B enter the cross dichroic prism 64, at which three modulated color lights are synthesized to form a color image. The cross dichroic prism 64 includes a dielectric multilayer member that reflects the red light, and a dielectric multilayer member that reflects the blue light. Such dielectric multilayer members are disposed along the boundary of four right-angle prisms, which can be seen as X-like shape in FIG. 6. Three modulated color lights can be synthesized by such dielectric multilayer member as synthesized light, which is to be projected as a color image. The synthesized light synthesized by the cross dichroic prism 64 exits toward the projection lens 2.

Figure 7:
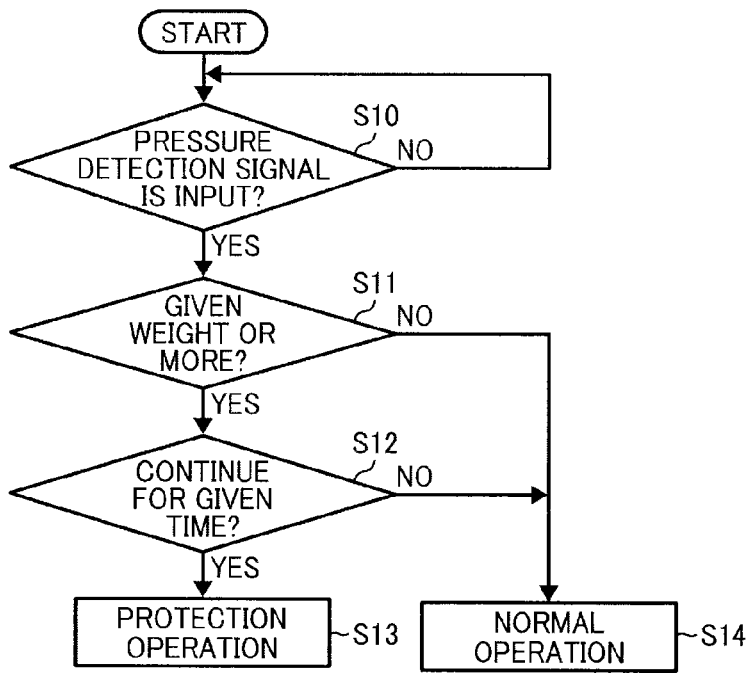
FIG. 7 shows a flowchart of steps of detecting an object and a subsequent protection operation.

A description is given of detection of an object and activation of protection operation according to an example embodiment with reference to FIG. 7. As above described, the pressure sensor 8 is disposed near the light projection unit 6 disposed on the top face 1b of the housing 1a of the projector 1 to detect an object. When the pressure sensor 8 detects pressure greater than a given level, the controller 20 determines that the object is present near the light projection unit 6 disposed on the top face 1b of the projector 1, and then activates the protection operation.

FIG. 7 shows a flowchart of step of detecting the object and subsequent activation of the protection operation, which controllable by the controller 20.

When a pressure detection signal is input from the pressure sensor 8 (step S10:YES) shown in FIG. 5, the controller 20 determines whether the weight corresponding to a pressure level indicated by the detection signal (i.e., a load applied to the top face 1b of the housing 1a) is a threshold weight or more (step S11). The threshold weight may be also referred to threshold load.

When it is determined that the weight is the threshold weight or more (step S11:YES), the controller 20 determines whether such detection signal from the pressure sensor 8 is continuously input for a given time duration (step S12).

If it is determined that the detection signal is continuously input for the given time duration (step S12:YES), the controller 20 determines that the object is present on the top face 1b of the housing 1a, and activates the protection operation of the projector 1 (step S13).

If it is determined that the weight is less than the threshold weight (step S11:NO), or even if it is determined that the weight is given weight or more, if such over-weight condition is not continuously for the given time (step S12:NO), the controller 20 determines that the object is not present on the top face 1b of the housing 1a, and does not activate the protection operation of the projector 1 but continues a normal operation (step S14).

As above described, the object detection and the activation of protection operation can be determined based on pressure detected by the pressure sensor 8, and the detection-continued time. Specifically, the threshold weight for the object can be set, for example, at 4 g, because a typical A4 sheet of paper has a weight of about 4 g.

Further, if only the pressure level is used for detecting the object, a false detection or misdetection may occur when the operation buttons of the operation unit 7 are pressed as above described. To reduce such false detection or misdetection, the time duration that the pressure is applied may be also used as determination criteria. For example, a given time duration can be set, for example, one second.

However, it should be noted that the given time duration alone may not be good enough for a correct detection in some cases. Because the operation buttons may be pressed intermittently or occasionally, if the pressure is detected intermittently (i.e., if detection signals are input intermittently), it can be determined that the operation buttons is pressed, and the protection operation is not activated.

Further, if the pressure sensor 8 is disposed at a position near the light projection unit 6 and far enough from the operation unit 7 to avoid the operation effect of the operation unit 7, the pressure level alone can be used as determination criteria.

The protection operation of the projector 1 when the object is detected can be activated as follows. For example, the controller 20 controls the image signal processor 11, which is a signal processing circuit, to display images on the liquid crystal panel 12, and then limits the intensity of light projected from the projection lens 2.

When a black image is to be projected by the projector 1, the panel driver 13 instructs liquid crystal elements included in the liquid crystal panel 12 not to pass through the light. Therefore, if the entire screen image is set to black, the intensity of light projected from the liquid crystal projector can be reduced or limited. Further, the controller 20 can control the lamp ON/OFF processor 16 to set OFF for the light source L, by which operation of the projector 1 can be stopped.

Further, an audio output unit 18 such as a piezoelectric buzzer can be further disposed for the projector 1 to generate an alarm signal or sound, or a speaker can be disposed for the projector 1 to generate a warning or alert when a given condition such as detecting an object on the top face is detected.

Further, an exhaust unit 19, which can blow gas, can be further disposed near the light projection unit 6 as shown in FIG. 4. If the weight of the object, corresponding to a pressure detection signal, is about the weight of several sheets of paper, such sheets can be blown off by air from an exhaust port of the exhaust unit. Such airflow can use, for example, cooling air that cools the inside of the housing 1a. For example, sheets can be blown off from the top face 1b by changing an angle of the exhaust port as required.

As above described, in the above described example embodiment, the projector includes the light projection unit disposed at the top face of the projector, and the pressure sensor 8 is disposed on the top face, by which it can detect whether the projection lens may be covered by the object placed on the top face of the projector, and the protection operation or protection function can be activated.

Further, in the above described example embodiment, the light projection unit is disposed on the top face 1b of the housing 1a, but the position of the light projection unit is not limited thereto.

Further, in the above described example embodiment, the top face 1b of the housing 1a may be a horizontal face, but the top face may be a slanted face or the like.

Further, the above described example embodiment can be applied to a projector having the light projection unit 6 disposed on the top face 1b of the housing 1a, and also to a projector having the light projection unit 6 disposed on a lateral face of the projector. Even if the light projection unit 6 is disposed on the lateral face of the projector, the object such as paper or cloth placed on the top face 1b of the housing 1a may drape and cover the light projection unit 6, by which the above mentioned problems may occur. Therefore, even if the light projection unit 6 is disposed on the lateral face of the projector (e.g., horizontal projector), a pressure detector such as a piezoelectric sensor may be preferably disposed on the top face 1b of the housing 1a, by which the object present on the top face can be detected, and the protection operation can be activated, as required.

In the above described example embodiment, a detector to detect a load on a top face of a housing is provided. The above described example embodiment can be applied to a projector in which the detector can detect whether a object is present on or over the light projection unit having the projection lens that projects light. Based on the detection result of the detector, a protection operation or protection function of a projector can be activated, by which damage to the object and/or malfunction of the projector can be prevented.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured using various types of processors, circuits, processing devices, processing circuits or the like such as a programmed processor, a circuit, an application specific integrated circuit (ASIC), used singly or in combination. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors, which are programmed or configured according to software code. A circuit does not include pure software, although a circuit does include the above-described hardware executing software.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A projector, comprising:
   a housing;
   a light source disposed in the housing;
   a light projection unit, disposed in the housing, to project light emitted from the light source;
   a pressure sensor disposed on a top face of the housing which detects a load as a weight of an object placed on the top face and blocking the light projection unit; and
   a microprocessor configured to activate a protection operation for the projector when the pressure sensor detects that the load caused by the object blocking the light projection unit exceeds a threshold load.

2. The projector of claim 1, further comprising:
   a signal processor to process image signals input to the projector from another device; and
   a modulator to display an image based on the image signals processed by the signal processor, and to modulate light emitted from the light source based on the displayed image,
   wherein the protection operation comprises the modulator displaying a black image.

3. The projector of claim 1, wherein the protection operation comprises the microprocessor turning the light source OFF.

4. The projector of claim 1, further comprising an audio output unit,
   wherein the protection operation comprises the microprocessor causing the audio output unit to output an alarm.

5. The projector of claim 1, wherein the projector is a vertical projector.

6. The projector of claim 1, wherein the projector is a horizontal projector.

7. The projector claim 1, wherein the microprocessor is configured to activate a protection operation for the projector when the pressure sensor detects that the load caused by the object blocking the light projection unit exceeds the threshold load continuously over a predetermined time period.

8. A projector, comprising:
   a housing;
   a light source disposed in the housing;
   a light projection unit, disposed in the housing, to project light emitted from the light source;
   a detector to detect a load caused by an object blocking the light projection unit;
   a microprocessor configured to activate a protection operation for the projector when the detector detects that the load caused by the object blocking the light projection unit exceeds a threshold load; and
   a exhaust unit disposed near the light projection unit,
   wherein the protection operation comprises the microprocessor directing airflow from the exhaust unit against the object to displace the object.

* * * * *